(12) United States Patent
Hawkins et al.

(10) Patent No.: US 6,975,304 B1
(45) Date of Patent: Dec. 13, 2005

(54) INTERFACE FOR PROCESSING OF AN ALTERNATE SYMBOL IN A COMPUTER DEVICE

(75) Inventors: Jeffrey C. Hawkins, Atherton, CA (US); William B. Rees, Menlo Park, CA (US); Debbie O. Chyi, Burlingame, CA (US); Robert Y. Haitani, Menlo Park, CA (US)

(73) Assignee: Handspring, Inc., Mountain View, CA (US)

( * ) Notice: Subject to any disclaimer, the term of this patent is extended or adjusted under 35 U.S.C. 154(b) by 390 days.

(21) Appl. No.: 09/977,870

(22) Filed: Oct. 14, 2001

Related U.S. Application Data

(60) Provisional application No. 60/297,817, filed on Jun. 11, 2001.

(51) Int. Cl.$^7$ .............................................. G09G 5/00
(52) U.S. Cl. ..................... 345/168; 345/864; 345/171; 715/531
(58) Field of Search ................................ 345/168–172, 345/173, 863; 341/22–26; 704/1–8; 715/531–536; 455/556.1, 566

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,545,023 A | 10/1985 | Mizzi | 364/709 |
| 4,587,630 A | 5/1986 | Straton et al. | |
| 4,725,694 A | 2/1988 | Auer et al. | |
| 4,916,441 A | 4/1990 | Gombrich | |
| 4,972,457 A | 11/1990 | O'Sullivan | 379/59 |
| 5,067,164 A | 11/1991 | Denker et al. | |
| 5,101,439 A | 3/1992 | Kiang | |
| 5,127,041 A | 6/1992 | O'Sullivan | 379/59 |
| RE34,034 E | 8/1992 | O'Sullivan | 375/59 |
| 5,189,632 A | 2/1993 | Paajanen et al. | 364/705.05 |
| 5,227,614 A | 7/1993 | Danielson et al. | |
| 5,249,218 A | 9/1993 | Sainton | 375/59 |
| 5,334,824 A | 8/1994 | Martinez | |
| 5,335,276 A | 8/1994 | Thompson et al. | 380/21 |
| 5,353,334 A | 10/1994 | O'Sullivan | 379/59 |
| 5,367,563 A | 11/1994 | Sainton | 379/98 |
| D354,478 S | 1/1995 | Miyahara | |
| 5,379,057 A | 1/1995 | Clough et al. | |

(Continued)

FOREIGN PATENT DOCUMENTS

| | | | | |
|---|---|---|---|---|
| CA | 2187050 | 5/1997 | | H05K 5/03 |

(Continued)

OTHER PUBLICATIONS

U.S. Appl. No. 07/831,671.

(Continued)

Primary Examiner—Alexander Eisen
(74) Attorney, Agent, or Firm—Fenwick & West LLP

(57) ABSTRACT

Described herein is a computer-implemented system and method for processing one or more alternate symbols associated or linked to a base symbol. A base symbol is a symbol to which at least one alternate symbol is linked. A base symbol commonly appears on a key of a keyboard or a display or a keyboard, or is a handwritten symbol recognized by handwriting entry software. Examples of alternate symbols are accented characters and punctuation marks that do not appear on a keyboard or are not commonly recognized by a handwriting entry program, and short symbol sequences. An example of a common short symbol sequence is an emoticon used in e-mail messages to convey tone or feelings. An example of a computer device that may embody the system or method is a hand-held computing device.

32 Claims, 8 Drawing Sheets

U.S. PATENT DOCUMENTS

| | | |
|---|---|---|
| 5,392,447 A | 2/1995 | Schlack et al. |
| D359,734 S | 6/1995 | Nagele et al. ............. D14/138 |
| 5,436,960 A | 7/1995 | Campana, Jr. et al. ........ 379/58 |
| 5,438,611 A | 8/1995 | Campana, Jr. et al. ........ 379/58 |
| 5,446,759 A | 8/1995 | Campana, Jr. et al. ...... 375/267 |
| 5,465,401 A | 11/1995 | Thompson |
| 5,479,472 A | 12/1995 | Campana, Jr. et al. ........ 379/58 |
| 5,485,373 A * | 1/1996 | Davis et al. ................. 715/536 |
| 5,496,992 A * | 3/1996 | Madan et al. .......... 235/472.02 |
| 5,550,715 A | 8/1996 | Hawkins ...................... 362/31 |
| 5,584,054 A | 12/1996 | Tyneski et al. ............... 455/89 |
| 5,594,640 A * | 1/1997 | Capps et al. ................ 715/532 |
| 5,625,670 A | 4/1997 | Campana, Jr. et al. ........ 379/58 |
| 5,631,946 A | 5/1997 | Campana, Jr. et al. ........ 379/58 |
| 5,640,146 A | 6/1997 | Campana, Jr et al. ....... 340/573 |
| 5,640,444 A | 6/1997 | O'Sullivan .................... 379/59 |
| 5,650,769 A | 7/1997 | Campana, Jr. et al. ...... 340/573 |
| D385,875 S | 11/1997 | Harris et al. |
| D386,497 S | 11/1997 | Huslig et al. |
| 5,694,428 A | 12/1997 | Campana, Jr. et al. ...... 375/260 |
| 5,710,798 A | 1/1998 | Campana, Jr. et al. ...... 375/347 |
| 5,714,937 A | 2/1998 | Campana, Jr. et al. ...... 340/573 |
| 5,717,725 A | 2/1998 | Campana, Jr. et al. ...... 375/347 |
| 5,722,059 A | 2/1998 | Campana, Jr. et al. ... 455/226.2 |
| 5,722,064 A | 2/1998 | Campana, Jr. et al. ...... 455/351 |
| D393,856 S | 4/1998 | Lee et al. ................... D14/138 |
| 5,742,644 A | 4/1998 | Campana, Jr. et al. ...... 375/316 |
| 5,745,532 A | 4/1998 | Campana, Jr. et al. ...... 375/347 |
| 5,751,773 A | 5/1998 | Campana, Jr. et al. ...... 375/346 |
| D395,300 S | 6/1998 | Yamazaki et al. |
| 5,761,621 A | 6/1998 | Sainton ...................... 455/453 |
| 5,797,089 A | 8/1998 | Nguyen |
| 5,797,098 A * | 8/1998 | Schroeder et al. .......... 455/464 |
| 5,805,633 A | 9/1998 | Uddenfeldt ................. 375/202 |
| 5,812,117 A | 9/1998 | Moon ........................ 345/169 |
| 5,818,437 A | 10/1998 | Grover et al. |
| 5,819,172 A | 10/1998 | Campana, Jr. et al. ...... 455/412 |
| 5,825,353 A | 10/1998 | Will |
| 5,825,675 A | 10/1998 | Want et al. ............... 364/708.1 |
| 5,854,985 A | 12/1998 | Sainton et al. .............. 455/553 |
| 5,864,805 A * | 1/1999 | Chen et al. .................. 704/235 |
| 5,884,323 A | 3/1999 | Hawkins et al. |
| D408,021 S | 4/1999 | Haitani et al. |
| D408,030 S | 4/1999 | Richards et al. |
| D409,185 S | 5/1999 | Kawashima |
| D410,486 S | 6/1999 | Takahata et al. |
| 5,966,671 A | 10/1999 | Mitchell et al. |
| D416,001 S | 11/1999 | Tal et al. |
| D416,256 S | 11/1999 | Griffin et al. |
| 5,983,073 A | 11/1999 | Ditzik |
| 5,990,872 A | 11/1999 | Jorgenson et al. .......... 345/168 |
| 6,000,000 A | 12/1999 | Hawkins et al. |
| 6,006,274 A | 12/1999 | Hawkins et al. |
| D421,744 S | 3/2000 | Ono |
| 6,040,829 A | 3/2000 | Croy et al. |
| 6,043,760 A * | 3/2000 | Laakkonen ................... 341/22 |
| D423,468 S | 4/2000 | Jenkins |
| 6,058,304 A | 5/2000 | Callighan et al. ........... 455/422 |
| 6,067,451 A | 5/2000 | Campana, Jr. et al. ...... 455/412 |
| D432,099 S | 10/2000 | Loh et al. |
| D432,535 S | 10/2000 | Loh et al. |
| D433,016 S | 10/2000 | Matsuda et al. |
| 6,134,453 A | 10/2000 | Sainton et al. .............. 455/553 |
| 6,141,540 A | 10/2000 | Richards et al. ............... 455/90 |
| 6,169,485 B1 | 1/2001 | Campana, Jr. et al. ...... 340/573 |
| 6,188,789 B1 | 2/2001 | Marianetti, II et al. ..... 382/189 |
| D439,232 S | 3/2001 | Ledingham et al. |
| 6,198,783 B1 | 3/2001 | Campana, Jr. et al. ...... 375/346 |
| 6,204,848 B1 * | 3/2001 | Nowlan et al. ............. 715/810 |
| RE37,141 E | 4/2001 | O'Sullivan .................. 455/557 |
| D440,959 S | 4/2001 | Wolf et al. |
| 6,219,694 B1 | 4/2001 | Lazaridis et al. ........... 709/206 |
| D442,156 S | 5/2001 | Lee |
| D443,865 S | 6/2001 | Kim |
| D446,199 S | 8/2001 | Xu et al. |
| 6,272,190 B1 | 8/2001 | Campana, Jr. et al. ...... 375/345 |
| 6,278,442 B1 | 8/2001 | Griffin et al. ............... 345/169 |
| 6,288,718 B1 | 9/2001 | Laursen et al. |
| 6,295,372 B1 | 9/2001 | Hawkins et al. |
| 6,295,460 B1 | 9/2001 | Nagel et al. ................. 455/557 |
| 6,307,548 B1 | 10/2001 | Flinchem et al. |
| D450,307 S | 11/2001 | Xu et al. |
| 6,317,592 B1 | 11/2001 | Campana, Jr. et al. ...... 455/412 |
| 6,330,618 B1 | 12/2001 | Hawkins et al. |
| D454,349 S | 3/2002 | Makidera et al. |
| D455,135 S | 4/2002 | Hyun |
| 6,370,518 B1 | 4/2002 | Payne et al. |
| D456,805 S | 5/2002 | Ono et al. |
| 6,397,078 B1 | 5/2002 | Kim |
| 6,477,482 B1 | 11/2002 | Maupin et al. |
| 6,489,950 B1 * | 12/2002 | Griffin et al. ............... 345/168 |
| 6,549,304 B1 | 4/2003 | Dow et al. |
| 6,611,697 B1 | 8/2003 | Ewing et al. |
| 6,662,244 B1 | 12/2003 | Takahashi |
| 6,725,060 B1 | 4/2004 | Chhatriwala et al. |
| 6,727,916 B1 | 4/2004 | Ballard |
| 2001/0027121 A1 | 10/2001 | Bossen |
| 2002/0021311 A1 | 2/2002 | Schecter et al. |
| 2002/0088702 A1 | 7/2002 | Lai et al. |
| 2002/0097927 A1 * | 7/2002 | Chu et al. ................... 345/168 |
| 2002/0126097 A1 | 9/2002 | Savolainen |
| 2002/0186262 A1 | 12/2002 | Itavaara et al. |
| 2003/0123427 A1 | 7/2003 | Pinard et al. |

FOREIGN PATENT DOCUMENTS

| | | | |
|---|---|---|---|
| EP | 0149762 A1 | 7/1986 | |
| EP | 0 813 328 A2 | 12/1997 | .......... H04M 1/23 |
| EP | 0 840 934 B1 | 4/1999 | .......... H01H 13/70 |
| WO | WO 94/10678 | 5/1994 | ............ G09G 5/14 |
| WO | WO 94/16408 | 7/1994 | ............ G06K 9/00 |
| WO | WO 96/01453 | 1/1996 | ............ G06K 9/00 |
| WO | WO 00/65445 | 11/2000 | ............ G06F 11/00 |

OTHER PUBLICATIONS

U.S. Appl. No. 09/670,696.
U.S. Appl. No. 09/813,165.
BlackBerry Handheld Users Guide, Sep. 7, 1999.
BlackBerry Developer's Guide SDK User's Guide Version 2.0 (Data TAC), Jun. 12, 2000.
BlackBerry Desktop Software Installation and Getting Started Guide, Feb. 5, 1999.
BlackBerry Enterprise Server Software Installation and Getting Started Guide, Sep. 29, 1999.
Compaq Product Information, *iPAQ Pocket Options*, [retrieved Nov. 13, 2001], retrieved from internet: www.compaq.com/products/handhelds.
Choi, H., *First Look: Samsung I300 Cellphone/PDA*, retrieved from internet www.techtv.com, Mar. 28, 2001.
Handspring Product Information: *VisorPhone The Springboard Module that Transforms your Visor into an Extraordinary Phone*, (2000).
Handspring, *Sprint and Airprime Delivery First Wireless CDMA Phone and Data Module for the Handspring Visor*, [retrieved Aug. 6, 2001], retrieved from internet www.handspring/pr59.jhtml.
Handspring VisorPhone Module User Guide, (2000-2001).
U.S. Appl. No. 09/835,464.
U.S. Appl. No. 09/953,211.

IBM Technical Disclosure Bulletin: *SimpleUser Interface to a Cellular Telephone*, Oct. 1995, pp 349-350, [retrieved Jul. 5, 2001], retrieved from internet.

IBM Technical Disclosure Bulletin: *Inexpensive Personal Digital Assistant*, Apr. 1995, pp. 535-526, [retrieved Jul. 5, 2001], retrieved from internet.

Kyocera's Smartphone Series, retrieved from internet www.kyocera-wireless.com, 2001.

Mossberg, W., *Samsung Embeds Cellphone Inside Palm in New I300 Device*, Aug. 30, 2001, [retrieved Oct. 26, 2001], retrieved from internet http://www.ptech.wsj.com/archive/ptech-20010830.html.

Newspaper Article: *Ways to Escape Multiple-Remote Hell*, San Jose Mercury News, Jun. 14, 2001.

Nokia 9110 Accessories Quick Guide Instruction Manual, 1999.

Sprint PCS User Guide—Samsung Model SCH-8500, 1999.

Tam, P., "Palm, Motorola to Make PDA Cell Phones", Sep. 25, 2000, [retrieved Jun. 19, 2001], retrieved from internet http://www.zdnet.com/zdnn/stories/news/0,4586,2631800,00.html.

Technical White Paper BlackBerry Enterprise Edition for Microsoft Exchange, Version 2.1, (1999-2001).

Technical White Paper BlackBerry Enterprise Server for Microsoft Exchange, Version 2.1, (1997-2001).

TUCOWS PDA Phone GSM Dailer: GSM Dailer 1.0, Nov. 30, 2000, [retrieved Jun. 19, 2001], retrieved from internet http://pds.rcp.net/pe/pocket/preview 154208.html, Jun. 19, 2001.

Compaq Product Information, *iPAQ Pocket PC Options*, [retrieved Nov. 13, 2001], retrieved from internet: www.compaq.com/products/handhelds.

Choi, H., *First Look: Samsung I300 Cellphone/PDA*, retrieved from internet www.techtv.com, Mar. 28, 2001.

Handspring, *Sprint and Airprime Delivery First Wireless CDMA Phone and Data Module for the Handspring Visor*, [retrieved Aug. 6, 2001], retrieved from internet www.handspring/pr59.jhtml Handspring VisorPhone Module User Guide, (2000-2001).

IBM Technical Disclosure Bulletin: *SimpleUser Interface to a Cellular Telephone*, Oct. 1995, pp. 349-350, [retrieved Jul. 5, 2001], retrieved from internet.

IBM Technical Disclosure Bulletin: *Inexpensive Personal Digital Assistant*, Apr. 1995, pp. 525-526, [retrieved Jul. 5, 2001], retrieved from internet.

Kyocera's Smartphone Series, retrieved from internet www.kyocera-wireless.com, 2001.

TUCOWS PDA Phone GSM Dailer: GSM Dailer 1.0, Nov. 30, 2000, [retrieved Jun. 19, 2001], retrieved from internet http://pds.rcp.net/pe/pocket/preview_154208.html.

User's Guide, hp iPAQ Pocket PC h4000 Series, Document Part No. 343434-001, Aug. 2003, 141 pages.

SyncML Website Introduction Page, SyncML Initiative Ltd., [Retrieved on Oct. 24, 2002]. Retrieved from the Internet <URL: http://www.www.syncml.org/about-intro.html>, 2 pages.

SynML Sync Protocol [Retrieved on Dec. 7, 2000]. Retrieved from the Internet: <URL:http://www.syncml.org/docs/syncml_protocol_v10_20001207.pdf>, 60 pages.

SynML Sync Protocol Version 1.0.1 [Retrieved on Jun. 15, 2001]. Retrieved from the Internet: <URL:http://www.syncml.org/docs/syncml_protocol_v101_20010615.pdf>, 61 pages.

Wireless Application Protocol, Service Loading, WAP-168-ServiceLoad-200110731-a, Version 31-Jul-2001, 18 pages.

Wireless Application Protocol, Service Indication, WAP-167-ServiceInd-200110731-a, Version 31-Jul-2001, 28 pages.

Wireless Application Protocol, Push Message, WAP-251-PushMessage-20010322-a, Version 22-Mar-2001, 14 pages.

Wireless Application Protocol, WAP-Sync-Spec, Data Synchronisation Specification, WAP-234-SYNC-20010530-a, Version 30-May-2001, 11 pages.

Wireless Application Protocol, Wireless Application Protocol, Wireless Markup Language Specification Version 1.3, WAP WML, WAP-191-WML, Feb. 19, 2000, 110 pages.

*American Programmer*, N.Y., American Programmer, Inc. (Dec. 1991), pp. 4-33.

*At Last, Technology Harnesse [sic] One of the Most Powerf [sic] Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: <URL:http://www.alt.com/press/0393/930308.nca.html> 2 pages.

Carr, R.M., *The Point of the Pen, Byte* (Feb. 1991, Reprinted), 10 pages.

Cullen, A., *Connecting With Your EO Cellular Module*, Mountain View, EO, Inc., 1992, 1993, pp. ii-33.

Cullen, A., *Getting Started With Your EO Personal Communicator*, Mountain View, EO, Inc., 1992, 1993, pp. Ii-74.

Cullen, A., *Lookup Guide to the EO Personal Communicator*, Mountain View, EO, Inc., 1992, 1993, pp. ii-320.

*Go Corporation Information Statement*, (Nov. 8, 1993), 114 pages.

*IBM Selects Racotek Data/Voice Communications Services to Interface With Touchmobile Product*, PR Newswire (Jan. 25, 1993), 2 pages.

*IBM TouchMobile Information and Planning. Guide*, International Business Machines Incorporated (Mar. 1993), 20 pages.

*IBM TouchMobile Solution for Data Capture and Communication, .Keeping Your Business Moving in the 90s*, International Business Machines Incorporated (Jan. 1993), 13 pages.

*IBM'S Touchmobile Helps Field Workers Collect Data at the Touch of a Finger*, PR Newswire (Jan. 26, 1993), 2 pages.

MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.

MacNeill, D., *Wireless Newton Technology Goes to Work*, On The Go Magazine [online]. (Sep. 8, 1993), Retrieved from the Internet: <URL:http://www.pencomputing.com/Newton/NewtonNotes1.html >2 pages.

Maki, K., *The AT&T EO Travel Guide*, N.Y., John Wiley & Sons, Inc., 1993, pp. iii-555.

Schlender, B. R., *Hot News PCs That Read Your Writing, Fortune* (Feb. 11, 1991, Reprinted), 6 pages.

Stock, R., *The World of Messaging An Introduction to Personal Communications*, Mountain View, EO, Inc., 1992, 1993, pp. ii-69.

\* cited by examiner

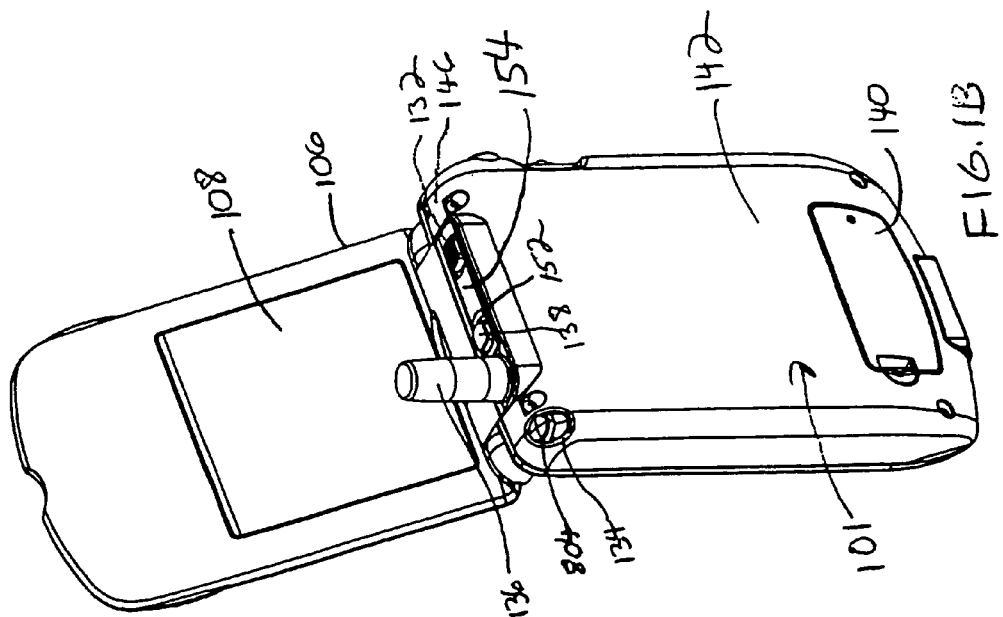
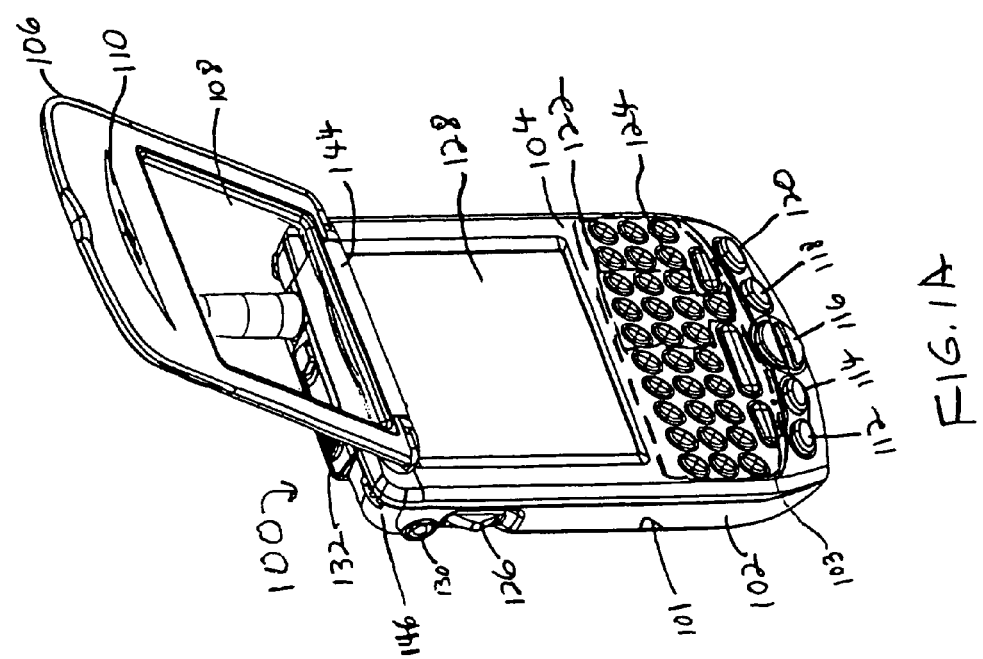

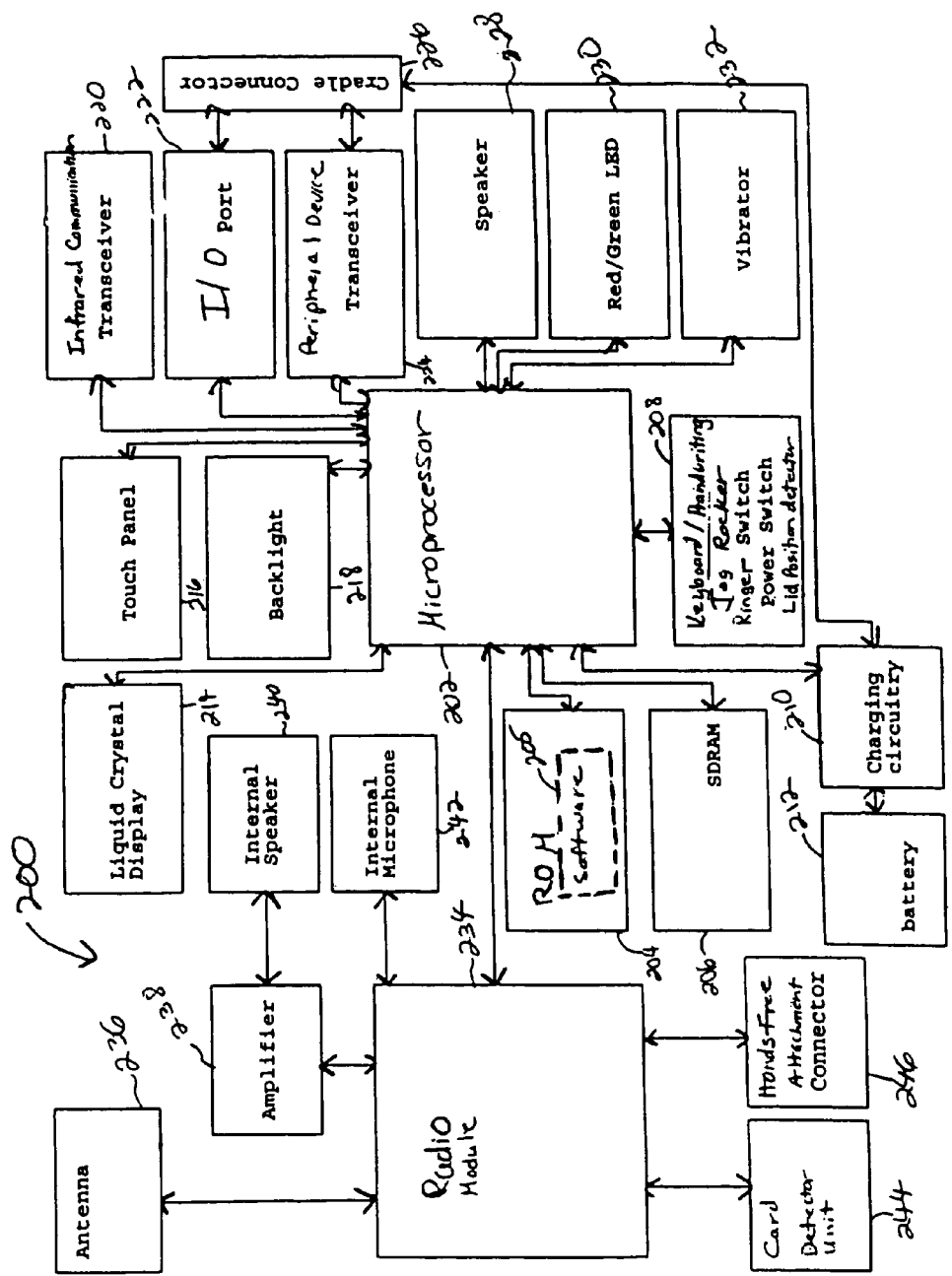

INTERFACE FOR PROCESSING OF AN ALTERNATE SYMBOL IN A COMPUTER DEVICE

CROSS-REFERENCE TO RELATED APPLICATION

This application claims priority under 35 U.S.C. 119(e) from U.S. provisional patent application 60/297,817, having a filing date of Jun. 11, 2001 which is entitled "Handheld Device," inventors Tom Bridgwater, Debbie Chyi, Robert Haitani, Jeff Hawkins, Eric Jacobsen, Will Rees, Peter Skillman, and Karl Townsend and which is hereby incorporated by reference.

BACKGROUND OF THE INVENTION

1. Field of the Invention

The present invention relates generally to systems and methods for symbol processing by a computing device, in particular a hand-held computing device.

2. Description of the Related Art

The integration of services into computer devices, including hand-held devices such as personal digital assistants, often involves an increased cost of time to the user to adapt to a new man-machine interface. The man-machine interface aspect of the data entry mechanisms is crucial to decreasing the learning curve time customers need to fully utilize the device for performing its various functions in order to decrease customer frustration. The ease of manipulation of data entry mechanisms enhances the overall device experience.

It is desirable to strike an appropriate balance between burdening the user with a bulkier device on the one hand with dedicated data entry mechanisms as part of the physical interface and on the other hand, providing a more limited man-machine interface requiring the user to have to learn more data entry techniques or to consume more time for data entry.

One example of how a limited man-machine interface can be time consuming occurs when a user desires to enter a character that is not located as part of the physical interface such as a keyboard or an initial view of a display presented to a user for entering text. For example, in trying to find an accented "ê" version of the letter "e", typically the user must go to a separate display of a table of all accented characters and search through one or more displays of accented characters carefully so as not to miss the one for which he is looking. Otherwise, the user can memorize special key sequences. A more pleasant and robust text entry experience that gives the user easy access to a wide range of symbols is highly desirable. The man-machine interface impacts the acceptability of the device to users because it impacts the extent of services provided, the effective use of the services, and the overall reliability of the device.

SUMMARY OF INVENTION

The present invention provides for a system and method for processing alternate symbols associated with or linked to a base symbol in a computer device. Example of computer devices that may embody the system or method are hand-held computing devices.

A base symbol is a symbol to which at least one alternate symbol is linked. A base symbol commonly appears on a key of a keyboard, a display of a keyboard, or is a handwritten symbol recognized by handwriting entry software. Examples of alternate symbols are accented characters and punctuation marks that do not appear on a keyboard or are not commonly recognized by a handwriting entry program, and short symbol sequences. An example of a common short symbol sequence is an emoticon used in e-mail messages to convey tone or feelings.

In one embodiment of a system for performing the invention, the system comprises a display, a memory, a processor coupled to the display and memory, and software for processing alternate symbols which may be stored in the memory, an example of a computer usable medium, and executed by the processor.

One embodiment of a computer-implemented method in accordance with the invention comprises receiving input indicating a request for an alternate symbol associated with a base symbol and displaying a list of at least one alternate symbol associated with the base symbol.

As a base symbol may have more than one alternate symbol associated with it, a base symbol may have a list of alternate symbols associated with it. In one embodiment, the list of alternate symbols and information associated with the list are stored in a memory. However, the list and/or information associated with the list may be updated in the memory according to criteria. In one embodiment, the criteria may be based on prior usage, and in another, the criteria may be user-defined.

BRIEF DESCRIPTION OF THE FIGURES

The figures depict one or more embodiments of the present invention for purposes of illustration only. One skilled in the art will readily recognize from the following discussion that alternative embodiments of the structures and methods illustrated herein may be employed without departing from the principles of the invention.

FIG. 1A illustrates a front perspective view of an embodiment of a hand-held computing device with a lid opened in an extended position in accordance with the present invention.

FIG. 1B illustrates a back perspective view of an embodiment of a hand-held computing device with a lid opened in an extended position in accordance with the present invention.

FIG. 2 illustrates a block diagram of an embodiment of a system enclosed within the case of the hand-held device comprising hardware and software for performing functions including functions related to communication services and symbol processing.

FIG. 4 illustrates an embodiment of the hand-held device comprising a handwriting area upon which a user can enter symbols through the use of a display data entry device such as a stylus or his or her finger.

DETAILED DESCRIPTION

Figure 1C:
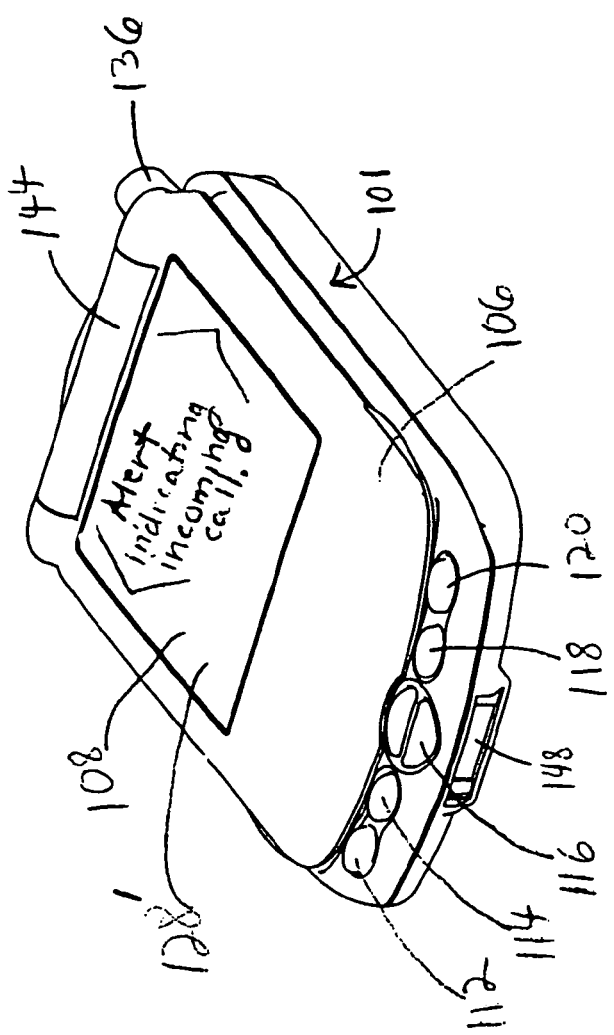
FIG. 1C illustrates a view of the front side of the embodiment of the hand-held device of FIG. 1A in a lid closed state in accordance with the present invention.

FIG. 1A illustrates a front view of an embodiment of a hand-held computing device with a lid opened in an extended position in accordance with the present invention. The embodiment of a hand-held device 100 depicted in FIG. 1A comprises a case 101 having a front side 104, and sides, for example, a first side 102. The front side104 comprises a display 128, in this embodiment a liquid crystal display (LCD) that is a touch-sensitive display. For example, the touch-sensitive display may include a digitizer. A user may use his or her finger or a stylus for data entry, for example, by indicating selections from a menu. In one embodiment, the display is a color display that displays color images. The front side 104 also comprises a keyboard 103, e.g. a QWERTY keyboard. User input devices embodied as application buttons 112, 114, 116, 118 and 120 are also shown. In this embodiment, one of the application buttons 112 is associated with a telephone application. Another application button 114 is associated with a calendar application. Another application button 116 is associated with a scroll-up, scroll-down feature. Another application button 118 may launch an Internet access application. An application button may be associated with more than one function or more than one application. In another example, an application button 120 may be associated with a messaging service, examples of which are electronic mail, e-mail, and Short Messaging Service (SMS).

Attached to the front side 104 above the display 128 is a lid 106. In this embodiment, the lid 106 is a flip lid that is hinged 144 above the display. The lid includes a transparent portion 108 through which a user can see the display even if the lid is closed. The lid 106 further has a speaker 110 in this embodiment.

As illustrated in this embodiment, the first side 102 includes a user input device, in this embodiment, a jog rocker 126. Also included on the side 102 of the device is a plug-in socket 130 for a hands-free speaker attachment. Examples of a hands-free speaker attachment may include a full headset or a single earpiece.

FIG. 1B illustrates a back side 142 of the embodiment of the hand-held device of FIG. 1A. Also shown is a top part 146 having an antenna 136, and a ringer switch 132 which interact with a radio module (See FIG. 2 234) inside of the case that provides for radio communications including cellular telephone functionality. In this embodiment, a power switch 138 is shown on the upper portion of the device. In this embodiment, a two-color light emitting diode (LED) 152 is shown on the upper portion of the device. In this embodiment, an infrared panel port 154 is shown on the upper portion of the device. The top part of the device includes an opening of a stylus holder 134. The stylus holder 134 extends cylindrically down the back side of the device. In this illustration of an embodiment of the device, a stylus is seated in the device as illustrated by a head 804 of the stylus. In addition, the back side 142 is shown in this embodiment to comprise a door 140. The door holds an identification card. One example of such an identification card is a subscriber identification module (SIM) card typically used with portable telephones used within the Global System for Mobile (GSM) communications networks. This feature allows the user to place the card in another device. For example, if a user is on another continent, the user can slip the card into another voice communication device such as a telephone designed to work at the frequencies allocated for that continent, country or group of countries.

FIG. 1C illustrates a view of the front side of the embodiment of the hand-held device of FIG. 1A in which the lid 106 is in a closed position. The lid extends over the keyboard and the display in the closed position. The lid having a transparent portion 108 provides a convenience to the customer and protection to the display of the device at the same time. For example, an alert of an incoming call notification is displayed on the display which is visible through the transparent lid. In this way, the lid also provides a protective cover of the device's display.

The case 101 encloses logic, for example hardware and/or software, for providing communication services and logic for symbol processing. Examples of symbols are letters, numbers, punctuation marks, emoticons typically used in e-mail messages, shortcut function keys, and mathematical symbols. An example of communication services is voice communications. FIG. 2 illustrates a block diagram of an embodiment of a system 200 comprising units making up the hardware and/or software for performing these functions. The system may be implemented in a printed circuit board. The system comprises a microprocessor 202, a read only memory (ROM) 204, a synchronous dynamic random access memory (SDRAM) 206, a user interface unit 208 for processing input from the keyboard 103 or a handwriting area (see FIG. 7, 702), the jog rocker 126, the ringer switch 132 and the power switch 138. Also this unit 208 detects the state of the lid position to determine if the lid is closed or open. Connected to the microprocessor as well is charging circuitry 210 for providing power from the battery 212. In one embodiment, the microprocessor is a Dragonball VZ MC68VZ328 33 MHz processor. In one embodiment, the battery is a Li-Ion 600 mAH battery. The charging circuitry is also connected to a cradle connector 226. The microprocessor is also connected with a liquid crystal display unit 214, a touch panel unit 216 and a backlight unit 218. The microprocessor 202 is also connected to a peripheral device transceiver 224, an example of which is a Universal Serial Bus (USB) transceiver, and an input/output (I/O) port 222, an example of which is an EIA-232 or a RS-232 port, both of which are also connected to the cradle connector 226. The microprocessor 202 is also connected to an infrared communication transceiver 220, an example of which is an Infrared Data Association (IrDA) transceiver. The microprocessor is also connected with speaker unit 228, an example of which is a piezo speaker, a red/green light emitting diode (LED) 230 unit, and a vibrator unit 232.

The microprocessor is also connected to a radio module 234 that provides for radio communications including cellular telephone functionality. An example of a radio module that may be used is a Wavecom Wismo GSM Module. Other services provided include Internet access and text messaging. An example of a text messaging service is the Short Message Service (SMS) which provides for sending and receiving short text messages from the hand-held computing device to another communication device, for example a personal digital assistant or a mobile phone.

The radio module is connected to an antenna 236, an amplifier 238 which is also connected to an internal speaker 240. The radio module is also connected to an internal microphone 242 as well as a card detector unit 244 and a hands-free attachment connector 246.

Those of skill in the art will understand that logic, for example hardware and/or software, enclosed within the device, for example the system depicted in FIG. 2, processes input from user input devices in different forms and performs functions with respect to the input. For example, the user interface unit 208 may be embodied in hardware and/or software under the control of the microprocessor 202. The microprocessor 202 may execute software instructions for receiving input and responding to it appropriately from software application programs 205 stored in a memory such as read only memory 204, and/or random access memory such as the illustrated SDRAM 206, and/or in the user interface unit 208.

A keyboard, such as a QWERTY keyboard, is advantageous for e-mail and other forms of electronic messaging in a hand-held device because data entry using a keyboard is more accurate than data entry using handwriting recognition software.

Figure 3A:
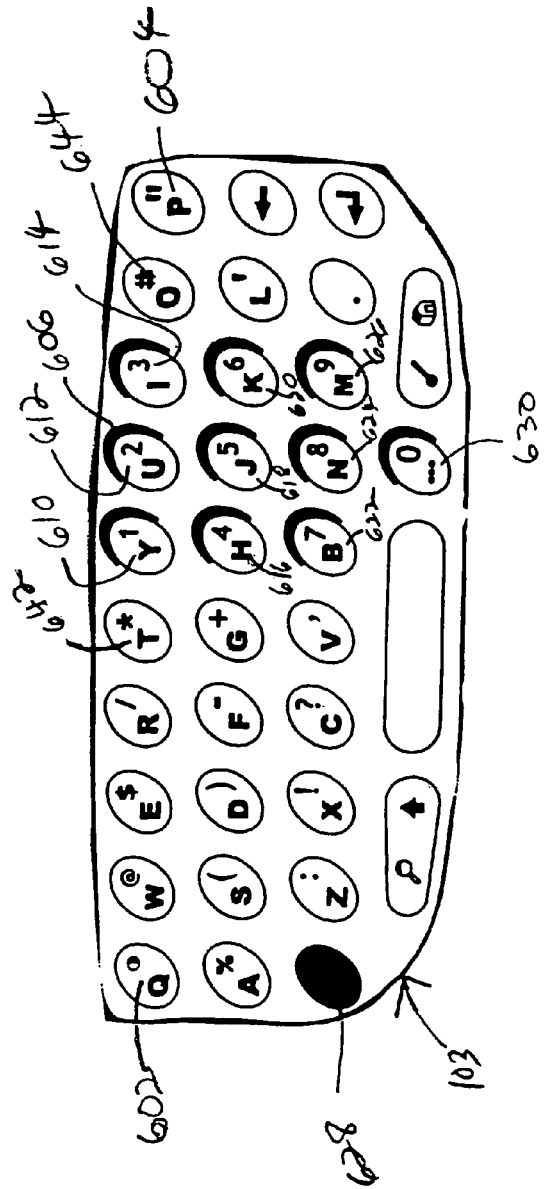
FIG. 3A illustrates an embodiment of a QWERTY keyboard of the hand-held device in accordance with the present invention.

In one version of the invention, a version of a QWERTY keyboard is used. For example, FIG. 3A illustrates an embodiment of a keyboard 103 that may be part of a hand-held computing device. The keyboard comprises the following keys: the letters a–z (26 keys), punctuation marks such as a period "." key. In one embodiment, the ". . . " symbol key 630 is a dedicated key for processing related to a request for an alternate symbol linked to a base symbol. Keys are also provided for such functions as "Space", "Return", "Backspace", as well as a "Shift" key, an "Option" key, and a "Menu/Command" key. It will be noted that beginning in the top row at the left side, the first six letters from left to right are "qwerty". The keys may be hardware keys or part of a displayed keyboard.

This embodiment includes an option key 628. Responsive to receiving input indicating that an option state is in effect, an option symbol associated with a key will be displayed responsive to receiving input indicating activation of the key. As shown, an option symbol associated with a key is displayed on the key. For example, as shown, normal symbol keys "y", "u" and "i" have respectively as their option symbols "1", "2" and "3".

Figure 3B:
FIG. 3B illustrates an embodiment of a layout of application buttons on the hand-held device.
Figure 8:
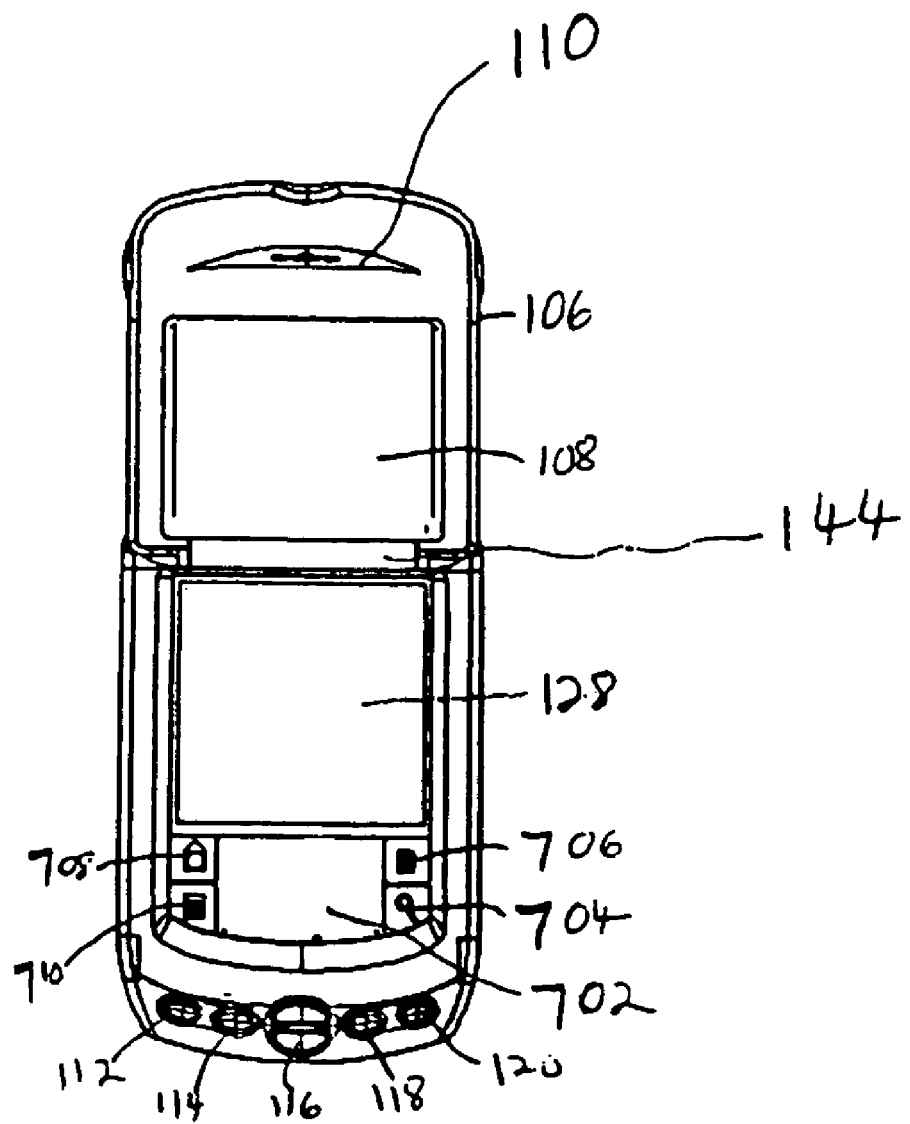

FIG. 3B illustrates an embodiment of the layout of the application buttons of the hand-held device. In this embodiment, one of the application buttons 632 is associated with a telephone application. Another application button 634 is associated with a calendar application. Another application button 636 is associated with a scroll-up, scroll-down feature. For example, a user may use this feature to scroll through entries in a menu. In this embodiment, application button 638 is associated with an application that provides Internet access. In this embodiment, an application button 640 is associated with a messaging application.

FIG. 4 illustrates another version of the embodiment of the hand-held device of FIGS. 1A, 1B and 1C. In the version of FIG. 4, the device comprises a handwriting area 702 upon which a user can enter symbols through the use of a stylus or his or her finger or other display contact data entry device. The icons surrounding the handwriting area are those typically used with the Graffiti™ program typically implemented in PALM OS® devices. The icons when tapped perform a function associated with the icon. For example, an applications icon 708 opens applications when tapped. The other icons are the menus icon 710, the calculator icon 706, and the find function icon 704 which allows a user to find text anywhere in his data. In the lid-closed position of the device, the embodiment of FIG. 4 would appear as the embodiment of the device having a transparent lid 108 in the closed position as illustrated in FIG. 1C. This embodiment of a hand-held device also comprises a system such as the example illustrated in FIG. 2 comprising logic, for example hardware and/or software, for providing communication services and symbol processing. For example, this device also includes radio communications functionality, for example, cellular telephone functionality as discussed above.

The number of symbols that can be displayed on a keyboard including displayed keyboards cannot typically cover every symbol. For example, a symbol such as the letter "e" is not typically available in a plurality of accented versions on a keyboard layout for the English language. Besides desiring to include in a message a different version of a symbol, a user may desire to find a symbol of the same type as one available on a keyboard. For example, a user may need the symbol for the Japanese yen, a symbol of the same type as the U.S. dollar sign "$" typically available on keyboards or accepted by handwriting recognition software. Furthermore, a user may desire to use a symbol having a relationship or connection with a symbol he has typed. Examples of relationships or connections may be logical relationships, relationships by association, or user-defined relationships. For example, the trademark symbol, ™ may be an alternate symbol linked to the letter "T". One association is that the symbol visually includes the letter. Another association is that the name of the symbol commonly used, e.g. "trademark symbol" begins with the base symbol. In another example, a command symbol that causes an action may also be an associated alternate symbol. An example of a command symbol is a <shortcut> symbol key, such as one that causes input to be received, the input indicating a command or request that is also associated with the activation of a sequence of keys or displayed items. Shortcut symbols may be associated with the letter "S" because shortcut begins with "S". Additionally, a shortcut symbol may be an alternate symbol associated with one or more of the base symbols represented by the keys or displayed items in the sequence.

Another kind of association or connection based relationship is a visual association relationship. For example, the British pound symbol "£" may also be associated with the letter "L" because they look similar. They may be visually associated because the both have a vertical line at the bottom of which another line protrudes in a general horizontal direction.

The relationship may also be context related. For example, the calendar application software may provide a list of alternate symbols including alternate symbols appropriate for the calendar application. For example, for the letter "j", short symbol sequences of the words "June" and "July" may be provided in the list.

A base symbol is a symbol to which at least one alternate symbol is linked. A base symbol commonly appears on a key, or is displayed in an initial view of a display for text entry or is a handwritten symbol recognized by handwriting entry software. Examples of alternate symbols are accented characters, punctuation marks that do not appear on a keyboard, and short symbol sequences. An example of a common short symbol sequence is an emoticon used in e-mail messages to convey tone or feelings.

Figure 5:
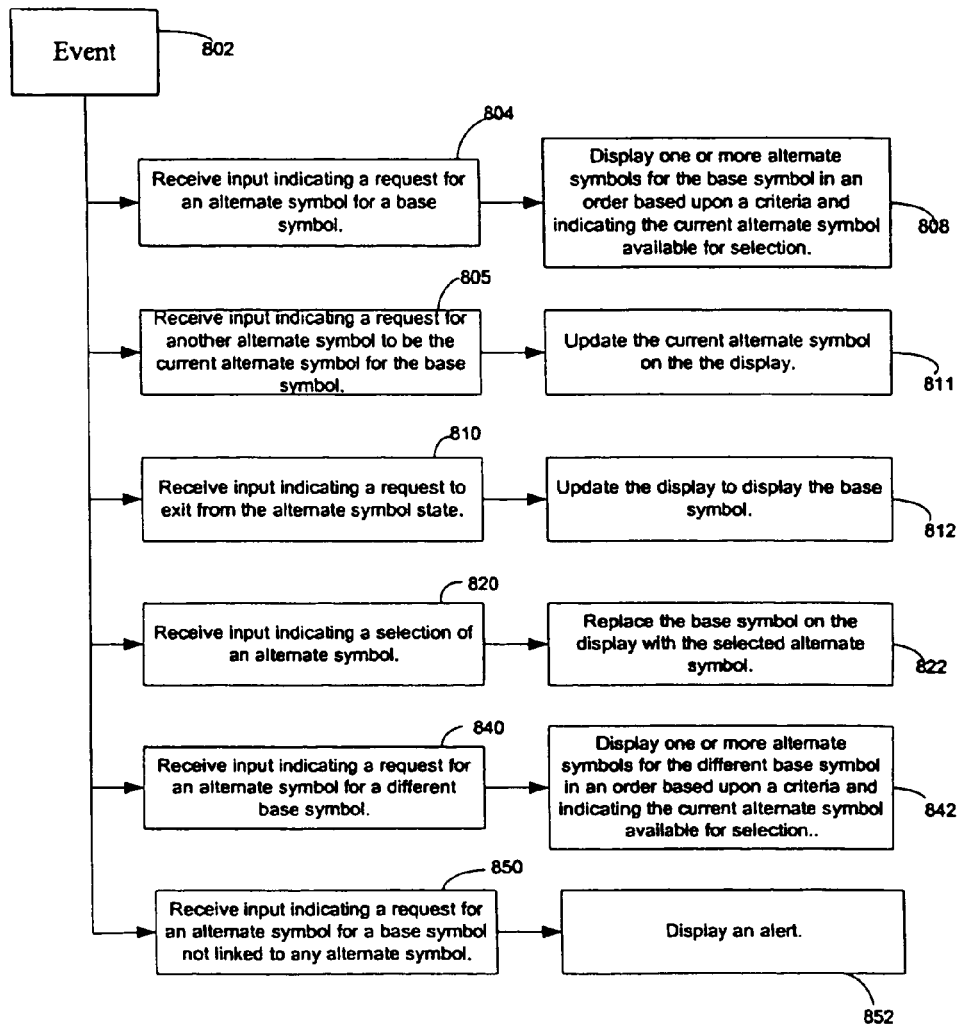
FIG. 5 illustrates an event flow diagram of an embodiment of one or more actions for providing symbols in an alternate symbol state.

FIG. 5 illustrates an event flow diagram of an embodiment of one or more actions for providing alternate symbols associated or linked with a base symbol. In one embodiment, the one or more actions may be implemented by the microprocessor 202 executing software instructions causing the actions described. Those of skill in the art will recognize that one or more of the methods may be implemented in embodiments of hardware and/or software and combinations thereof. For example, instructions for performing the one or more actions may be embodied within a computer usable medium.

Upon the occurrence of the event of receiving 804 input indicating a request for one or more alternate symbols linked to a base symbol, at least one alternate symbol for is displayed 808 for the base symbol. The order in which the alternate symbols are displayed may be based upon a criteria. A user may request an alternate symbol display view by typing a key sequence, for example <option><space> after entering a base symbol. Also, a sequence of contacts with a stylus or finger on a screen icon or a portion of the screen such as that displaying the base symbol may be detected to indicate a request. Requests may also be indicated by pressing a key dedicated for processing alternate symbols such as the ". . . " key 630 displayed on the keyboard in FIG. 3A. Or the user may request an alternate symbol for a base symbol by holding a key representing the base symbol down or maintaining a display contact for a designated amount of time.

Figures 6A, 6B, 6C:
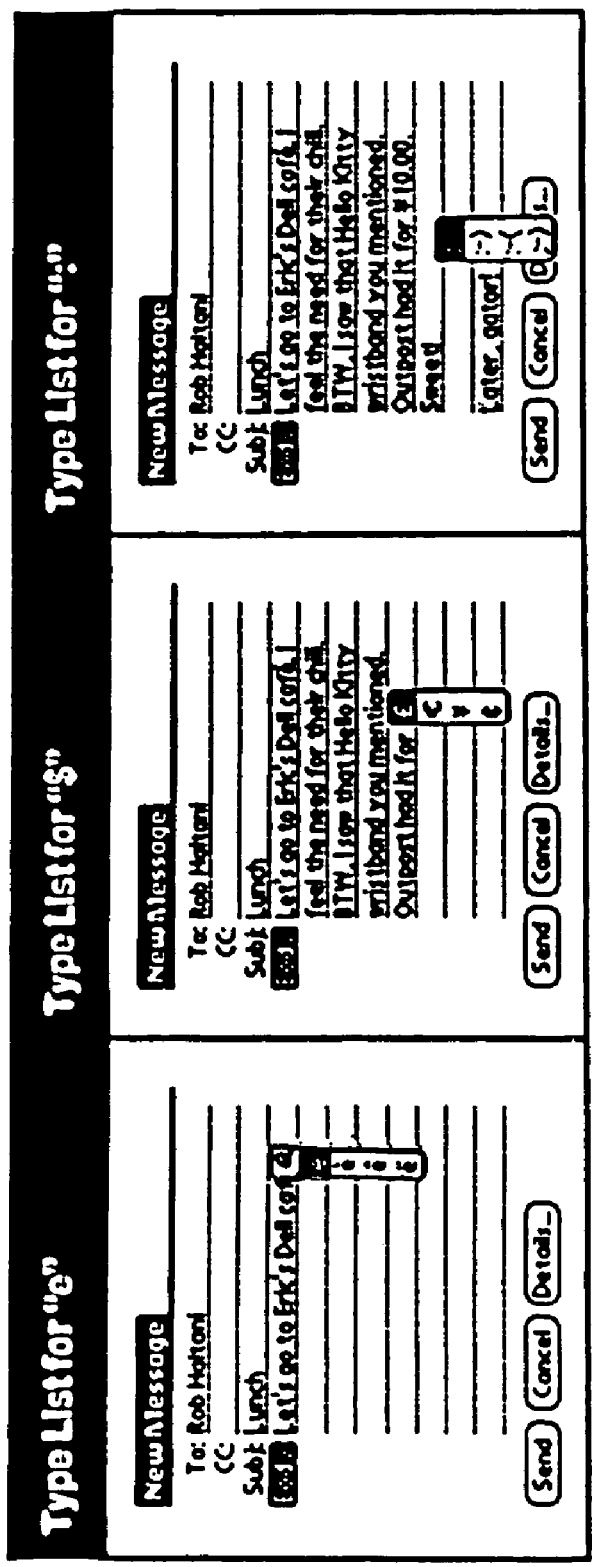
FIG. 6A illustrates an example of a display of at least one alternate symbol associated with a base symbol.
FIG. 6B illustrates another example of a display of at least one alternate symbol associated with a base symbol
FIG. 6C illustrates a third example of a display of at least one alternate symbol associated with a base symbol

Each of FIGS. 6A, 6B and 6C illustrate an example of a view of at least one alternate symbol associated with a base symbol. In each of these examples, the view is embodied as a pop-up menu displaying a list of alternate symbols. FIG. 6A illustrates a pop-up menu of a plurality of accented versions of the base letter "e". In the example of FIG. 6A, the base symbol "e" appears at the top of the pop-up menu followed by a list of alternate symbols associated with the base symbol. FIG. 6B illustrates another version of a pop-up menu of symbols of the same type as the "$". For example, the symbol "£" for the British pound and the symbol "¥" for the Japanese yen are also displayed. The current alternate symbol available for selection is indicated in this example by highlighting. FIG. 6C illustrates a pop-up menu display of examples of alternate symbols that have a logical or associational connection with the base symbol of colon ":" that the user has typed. The semi-colon ";" and the emoticons ":-)" indicating a smile or happiness, ":-(" indicating sadness, and the ";-)" typically associated with a smile with a wink or tongue in cheek expression. The semi-colon is typically associated with a colon either by sharing a common syllable or being on the same key in typical desktop keyboard. By association, the tongue in cheek emoticon uses a semi-colon so it is also linked or associated with the colon. The other displayed emoticons have a colon as part of their short sequences of symbols so they are logically or associationally connected to the colon.

Figure 6D:
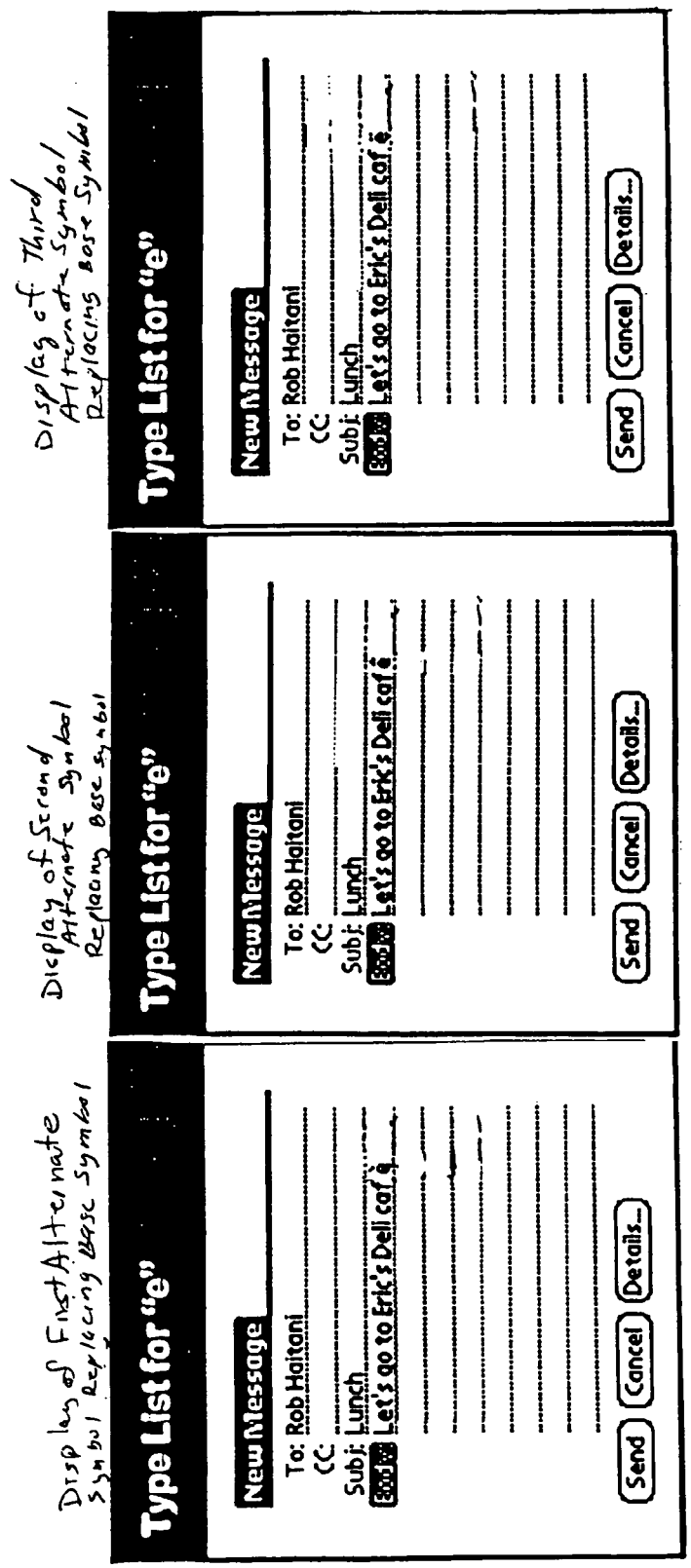
FIG. 6D illustrates a fourth example of a display of at least one alternate symbol associated with a base symbol

In another embodiment illustrated in FIG. 6D, the display is updated showing the base symbol replaced by a current alternate symbol. Responsive to receiving 805 input indicating a request for another alternate symbol to be the current alternate symbol for the base symbol, the display is updated 811 to indicate another current alternate symbol for the base symbol. The user may request another alternate symbol to be the current alternate symbol by pressing the dedicated key, or using the scroll button or the jog rocker scroll functionality. The alternate symbol may be indicated as the current alternate symbol that may be selected for the base symbol by highlighting it in the pop-up list or by replacing the base symbol with it on the screen.

Similarly, in another embodiment, a base symbol may have an alternate symbol such as a sequence of symbols or other symbols that are added to the base symbol. For example, the alternate symbols linked with the base symbol "." may include "com", "org", "biz", or "net" which are added after the period. The association of the period with these short symbol sequences is their common use in the same website name. The period is often called "dot" in this context. In natural language also, the "period" has become associated with the phrase "dot.com" to refer to a business type. Alternatively, the alternate symbols can include the symbol so that the symbol is replaced by the complete sequence. An example of this is the smile or happy emoticon linked to the base symbol, the colon.

Upon the occurrence of the event of receiving 820 input indicating selection of an alternate symbol for the base symbol, the base symbol is replaced 822 with the selected alternate symbol on the display. In one embodiment, a user may select an alternate symbol from a display by typing another symbol so that the alternate symbol is displayed and is followed by this other symbol. In other embodiments, the user may select an alternate symbol by using a specific key sequence or tapping the display either anywhere or in a specific location, for example with a finger or stylus. In other embodiments, examples of other keys that may be used to indicate selection are a <return> key, an <enter> key, or a <space> key. Alternatively, activating the jog rocker, for example by pressing it, may be used.

Upon the occurrence of receiving 810 input indicating a request to exit from the alternate symbol state, the display is updated 812 to display the base symbol. In one embodiment, the user may select the alternate symbol and type another symbol such as the next character in the sentence in order to exit the alternate symbol state. Also other examples of keys or key sequences that may be used to select an alternate symbol and exit the alternate symbol state include the <return> key, the <space> key, the jog rocker, or a tap on the desired alternate symbol displayed on the touch-sensitive display. However, a user may desire to leave the alternate symbol state without selecting an alternate symbol. In one embodiment, receiving input indicating activation of the <backspace> key causes an exit from the alternate symbol state.

In the event of receiving 850 input indicating a request for an alternate symbol for a base symbol not linked to any alternate symbol, an alert is displayed 852. Alerting the user may be performed in one way by displaying a message to the user. In another way, the user may be alerted by an audio sound such as a beep.

A user may not find the alternate symbol she was looking for in the list linked to the current base symbol. The user may desire to browse lists of alternate symbols associated with other base symbols. Responsive to the event of receiving 840 input indicating selection of a different base symbol while in the alternate symbol state, a view, such as a pop-up menu, of alternate symbols for the different base symbol is displayed 842.

The order of the list of one or more alternate symbols associated with a base symbol may be displayed based on different criteria. Information associated with the list may be stored with the list indicating a relationship to the criteria. For example, the information may be embodied as a header associated with the list. For example, one example of criteria is that the most common alternate symbol based on statistics may be displayed first. Such statistics may be pre-determined statistics based on general usage or surveys of all users. Alternatively, the order may be based on prior usage or context. For example, for each alternate symbol in a list, a frequency selection indicator may be associated with an alternate symbol to indicate the frequency with which that alternate symbol is selected. An example of a frequency selection indicator is a count of the number of selection times for a session or over the lifetime of the device. The alternate symbol with the highest frequency count is displayed first. Alternatively, the last selected alternate symbol may be the criteria for determining which alternate symbol is displayed first for a base symbol. The content of the list may also be configured based on these suggested criteria and others. For example, the list may be localized for a particular language. For example, devices for French language usage may have different symbols or a different order than those set-up for German language usage. Of course, either or both of the order and content may also be user configurable in other embodiments.

The above description is included to illustrate the operation of one or more embodiments and is not meant to limit the scope of the invention. The scope of the invention is to be limited only by the following claims. From the above discussion, many variations will be apparent to those skilled in the art that would yet be encompassed by the spirit and scope of the invention.

What is claimed is:

1. For use in a hand-held computing device, a computer-implemented method for providing an alternate symbol associated with a base symbol comprising:

receiving input requesting a first list of alternate symbols associated with a first base symbol; and displaying simultaneously a plurality of alternate symbols from the first list in a pop-up menu at an insertion location for at least one of the alternate symbols on a display of the hand-held device.

2. The method of claim 1 wherein displaying simultaneously a plurality of alternate symbols from the first list in a pop-up menu at an insertion location for at least one of the alternate symbols on a display of the hand-held device comprises:

displaying the plurality of alternate symbols of the first list in an order according to a user-defined criteria.

3. The method of claim 1 wherein displaying simultaneously a plurality of alternate symbols from the first list in a pop-up menu at an insertion location for at least one of the alternate symbols on a display of the hand-held device comprises:

displaying the plurality of alternate symbols of the first list in an order according to a criteria of the alternate symbol that was last selected for the base symbol is displayed first.

4. The method of claim 1 wherein displaying simultaneously a plurality of alternate symbols from the first list in a pop-up menu at an insertion location for at least one of the alternate symbols on a display of the hand-held device comprises:

displaying the plurality of alternate symbols in the first list in an order from first to last according to a criteria of descending order of a frequency of selection for each alternate symbol;

responsive to receiving input indicating one of the alternate symbols has been selected, increasing a frequency of selection indicator for the alternate symbol that has been selected; and storing the frequency of selection indicator in a memory.

5. The method of claim 1 wherein displaying simultaneously a plurality of alternate symbols from the first list in a pop-up menu at an insertion location for at least one of the alternate symbols on a display of the hand-held device comprises:

displaying the plurality of alternate symbols in the first list in an order from first to last according to a criteria of descending order of a frequency of selection for each alternate symbol, the frequency of selection being based on pre-determined statistics.

6. The method of claim 1 wherein the first list of alternate symbols includes a short symbol sequence.

7. The method of claim 1 wherein the first list of alternate symbols includes an accented symbol version of the base symbol.

8. The method of claim 1 wherein the first list of alternate symbols includes a symbol of the same type as the base symbol.

9. The method of claim 1 wherein the first list of alternate symbols includes a symbol having an associational relationship with the base symbol wherein the associational relationship is that the symbol includes the base symbol.

10. The method of claim 1 further comprising:

receiving input requesting a second list of alternate symbols associated with a second base symbol; and displaying simultaneously a plurality of alternate symbols from the second list in a pop-up menu at an insertion location for at least one of the alternate symbols on a display of the hand-held device.

11. The method of claim 1 wherein the first list of alternate symbols includes an emoticon.

12. A hand-held computing device for providing an alternate symbol associated with a base symbol comprising:

a display;

a memory;

a processor coupled to the display and memory;

a user input device for indicating a symbol; and software stored in the memory for providing an alternate symbol associated with a base symbol wherein the software comprises instructions for execution by the processor for performing the following:

receiving input requesting a first list of alternate symbols associated with a first base symbol; and displaying simultaneously a plurality of alternate symbols from the first list in a pop-up menu at an insertion location for at least one of the alternate symbols on a display of the hand-held device.

13. The device of claim 12 wherein displaying simultaneously a plurality of alternate symbols from the first list in a pop-up menu at an insertion location for at least one of the alternate symbols on a display of the hand-held device comprises:

displaying the plurality of alternate symbols of the first list in an order according to a user-defined criteria.

14. The device of claim 12 wherein displaying simultaneously a plurality of alternate symbols from the first list in a pop-up menu at an insertion location for at least one of the alternate symbols on a display of the hand-held device comprises:

displaying the plurality of alternate symbols of the first list in an order according to a criteria of the alternate symbol that was last selected for the base symbol is displayed first.

15. The device of claim 12 wherein displaying simultaneously a plurality of alternate symbols from the first list in a pop-up menu at an insertion location for at least one of the alternate symbols on a display of the hand-held device comprises:

displaying the plurality of alternate symbols in the first list in an order from first to last according to a criteria of descending order of a frequency of selection for each alternate symbol;

responsive to receiving input indicating one of the alternate symbols has been selected, increasing a frequency of selection indicator for the alternate symbol that has been selected; and storing the frequency of selection indicator in a memory.

16. The device of claim 12 wherein displaying simultaneously a plurality of alternate symbols from the first list in a pop-up menu at an insertion location for at least one of the alternate symbols on a display of the hand-held device comprises:

displaying the plurality of alternate symbols in the first list in an order from first to last according to a criteria of descending order of a frequency of selection for each alternate symbol, the frequency of selection being based on pre-determined statistics.

17. The device of claim 12 wherein the first list of alternate symbols includes a short symbol sequence as one of the one or more alternate symbols.

18. The device of claim 12 wherein the first list of alternate symbols includes an accented symbol version of the base symbol as one of the one or more alternate symbols.

19. The device of claim 12 wherein the first list of alternate symbols includes a symbol of the same type as the base symbol.

20. The device of claim 12 wherein the first list of alternate symbols includes a symbol having an associational relationship with the base symbol wherein the associational relationship is that the symbol includes the base symbol.

21. The device of claim 12 wherein the software further comprises instructions for execution by the processor for performing the following:
   receiving input requesting a second list of alternate symbols associated with a second base symbol; and
   displaying simultaneously a plurality of alternate symbols from the second list in a pop-up menu at an insertion location for at least one of the alternate symbols on a display of the hand-held device.

22. The device of claim 12 wherein the first list of alternate symbols includes an emoticon.

23. A computer usable medium comprising instructions for execution by a processor for performing a computer-implemented method for providing an alternate symbol associated with a base symbol for use in a hand-held computing device, the method comprising:
   receiving input requesting a first list of alternate symbols associated with a first base symbol; and
   displaying simultaneously a plurality of alternate symbols from the first list in a pop-up menu at an insertion location for at least one of the alternate symbols on a display of the hand-held device.

24. The medium of claim 23 wherein displaying simultaneously a plurality of alternate symbols from the first list in a pop-up menu at an insertion location for at least one of the alternate symbols on a display of the hand-held device comprises:
   displaying the plurality of alternate symbols of the first list in an order according to a user-defined criteria.

25. The medium of claim 23 wherein displaying simultaneously a plurality of alternate symbols from the first list in a pop-up menu at an insertion location for at least one of the alternate symbols on a display of the hand-held device comprises:
   displaying the plurality of alternate symbols of the first list in an order according to a criteria of the alternate symbol that was last selected for the base symbol is displayed first.

26. The medium of claim 23 wherein displaying simultaneously a plurality of alternate symbols from the first list in a pop-up menu at an insertion location for at least one of the alternate symbols on a display of the hand-held device comprises:
   displaying the plurality of alternate symbols in the first list in an order from first to last according to a criteria of descending order of a frequency of selection for each alternate symbol;
   responsive to receiving input indicating one of the alternate symbol has been selected, increasing a frequency of selection indicator for the alternate symbol that has been selected; and
   storing the frequency of selection indicator in a memory.

27. The medium of claim 23 wherein displaying simultaneously a plurality of alternate symbols from the first list in a pop-up menu at an insertion location for at least one of the alternate symbols on a display of the hand-held device comprises:
   displaying the plurality of alternate symbols in the first list in an order from first to last according to a criteria of descending order of a frequency of selection for each alternate symbol, the frequency of selection being based on pre-determined statistics.

28. A hand-held computing device for providing an alternate symbol associated with a base symbol comprising:
   means for receiving input requesting a first list of alternate symbols associated with a first base symbol; and
   means for displaying simultaneously a plurality of alternate symbols from the first list in a pop-up menu at an insertion location for at least one of the alternate symbols on a display of the hand-held device.

29. The device of claim 28 wherein the means for displaying simultaneously a plurality of alternate symbols from the first list in a pop-up menu at an insertion location for at least one of the alternate symbols on a display of the hand-held device comprises:
   means for displaying the plurality of alternate symbols of the first list in an order according to a user-defined criteria.

30. The device of claim 28 wherein the means for displaying simultaneously a plurality of alternate symbols from the first list in a pop-up menu at an insertion location for at least one of the alternate symbols on a display of the hand-held device comprises:
   means for displaying the plurality of alternate symbols of the first list in an order according to a criteria of the alternate symbol that was last selected for the base symbol is displayed first.

31. The device of claim 28 wherein the means for displaying simultaneously a plurality of alternate symbols from the first list in a pop-up menu at an insertion location for at least one of the alternate symbols on a display of the hand-held device comprises:
   means for displaying the plurality of alternate symbols in the first list in an order from first to last according to a criteria of descending order of a frequency of selection for each alternate symbol;
   means for increasing a frequency of selection indicator for the alternate symbol that has been selected responsive to receiving input indicating one of the alternate symbols has been selected; and
   means for storing the frequency of selection indicator in a memory.

32. The device of claim 28 wherein the means for displaying simultaneously a plurality of alternate symbols from the first list in a pop-up menu at an insertion location for at least one of the alternate symbols on a display of the hand-held device comprises:
   means for displaying the plurality of alternate symbols in the first list in an order from first to last according to a criteria of descending order of a frequency of selection for each alternate symbol, the frequency of selection being based on pre-determined statistics.

* * * * *

UNITED STATES PATENT AND TRADEMARK OFFICE
CERTIFICATE OF CORRECTION

PATENT NO.         : 6,975,304 B1                                    Page 1 of 1
APPLICATION NO.    : 09/977870
DATED              : December 13, 2005
INVENTOR(S)        : Jeffrey C. Hawkins et al.

It is certified that error appears in the above-identified patent and that said Letters Patent is hereby corrected as shown below:

On the title page under item (56), "References Cited, Foreign Patent Documents" please delete "2003/0123427" and insert --2003/0123627--.

On the title page under item (56), "References Cited, Foreign Patent Documents" please insert --2004/0047505 A1--.

Signed and Sealed this

Fifth Day of February, 2008

JON W. DUDAS
*Director of the United States Patent and Trademark Office*